(12) United States Patent
Khansari Zadeh et al.

(10) Patent No.: US 11,607,802 B2
(45) Date of Patent: Mar. 21, 2023

(54) ROBOTIC CONTROL USING ACTION IMAGE(S) AND CRITIC NETWORK

(71) Applicant: X Development LLC, Mountain View, CA (US)

(72) Inventors: Seyed Mohammad Khansari Zadeh, San Carlos, CA (US); Daniel Kappler, San Francisco, CA (US); Jianlan Luo, Berkeley, CA (US); Jeffrey Bingham, Sunnyvale, CA (US); Mrinal Kalakrishnan, Mountain View, CA (US)

(73) Assignee: X DEVELOPMENT LLC, Mountain View, CA (US)

( * ) Notice: Subject to any disclaimer, the term of this patent is extended or adjusted under 35 U.S.C. 154(b) by 342 days.

(21) Appl. No.: 16/886,545

(22) Filed: May 28, 2020

(65) Prior Publication Data
US 2021/0078167 A1 Mar. 18, 2021

Related U.S. Application Data

(60) Provisional application No. 62/900,571, filed on Sep. 15, 2019.

(51) Int. Cl.
*B25J 9/16* (2006.01)
*B25J 15/00* (2006.01)
(Continued)

(52) U.S. Cl.
CPC .............. *B25J 9/161* (2013.01); *B25J 9/163* (2013.01); *B25J 9/1612* (2013.01); *B25J 9/1664* (2013.01); *B25J 9/1697* (2013.01); *B25J 15/0028* (2013.01); *G06T 7/50* (2017.01); *G06T 7/70* (2017.01); *G06T 7/90* (2017.01);
(Continued)

(58) Field of Classification Search
None
See application file for complete search history.

(56) References Cited

U.S. PATENT DOCUMENTS

2007/0286336 A1* 12/2007 Bernard ................ G06T 7/0012
378/62
2018/0150955 A1* 5/2018 Takeda ................... G06V 10/44

FOREIGN PATENT DOCUMENTS

WO 2020180697 9/2020

OTHER PUBLICATIONS

Xinchen, Yan et al., "Data-Efficient Learning for Sim-to-Real Robotic Grasping using Deep Point Cloud Prediction Networks," Arxov.org, Cornell University Library, 201 Olin Library Cornell University Ithaca, NY 14853, Jun. 21, 2019 (Year: 2019).*

(Continued)

*Primary Examiner* — Edemio Navas, Jr.
(74) *Attorney, Agent, or Firm* — Gray Ice Higdon

(57) ABSTRACT

Generating and utilizing action image(s) that represent a candidate pose (e.g., a candidate end effector pose), in determining whether to utilize the candidate pose in performance of a robotic task. The action image(s) and corresponding current image(s) can be processed, using a trained critic network, to generate a value that indicates a probability of success of the robotic task if component(s) of the robot are traversed to the particular pose. When the value satisfies one or more conditions (e.g., satisfies a threshold), the robot can be controlled to cause the component(s) to traverse to the particular pose in performing the robotic task.

22 Claims, 10 Drawing Sheets

(51) Int. Cl.
  *G06T 7/70* (2017.01)
  *G06K 9/00* (2022.01)
  *G06T 7/50* (2017.01)
  *G06T 7/90* (2017.01)
  *G06V 20/10* (2022.01)

(52) U.S. Cl.
  CPC .... *G06V 20/10* (2022.01); *G06T 2207/10024* (2013.01); *G06T 2207/10028* (2013.01)

(56) References Cited

OTHER PUBLICATIONS

Prem Kumar Patchaikani et al., "A Single Network Adaptive Critic-Based Redundancy Resolution Scheme for Robot Manipulators," IEEE Transactions on Industrial Electronics, IEEE Service Center, Piscataway, NJ, USA, Aug. 2012 (Year: 2012).*
Bicchi, A. et al.; On the Closure Properties of Robotic Grasping. The International Journal of Robotics Research; pp. 1-25; dated 1995.
Bicchi, A. et al.; Robotic Grasping and Contact: A Review; In Proceedings ICRA; Millennium Conference—IEEE International Conference on Robotics and Automation. Symposia Proceedings; 8 pages; dated 2000.
Bohg, J. et al.; Data-Driven Grasp Synthesis—A Survey; Transactions on Robotics; IEEE; pp. 1-21; dated Apr. 14, 2016.
Bousmalis, K. et al.; Using Simulation and Domain Adaptation to Improve Efficiency of Deep Robotic Grasping; IEEE; 9 pages; dated Sep. 25, 2017.
Hernandez, C., et al.; Team Delft's Robot Winner of the Amazon Picking Challenge; Robotics Institute; pp. 1-13; dated Oct. 18, 2016.
Herzog, A., et al.; Learning of grasp selection based on shape-templates; Autonomous Robots; pp. 51-65; dated 2013.
James, S. et al.; Transferring End-to-End Visuomotor Control from Simulation to Real World for a Multi-Stage Task; Dyson Robotics Lab; pp. 1-10; dated Oct. 17, 2017.
James, S. et al.; Sim-to-real via sim-to-sim: Data-efficient robotic grasping via randomized-to-Canonical Adaptation Networks; IEEE Xplore; pp. 12627-12637; dated 2019.
Kalashnikov, D. et al.; Scalable Deep Reinforcement Learning for Vision-Based Robotic Manipulation; 2nd Conference on Robot Learning (CoRL 2018); Switzerland; p. 1-23; dated 2018.
Kappler, D. et al.; Leveraging Big Data for Grasp Planning; IEEE International Conference on Robotics and Automation (ICRA); pp. 4263-4270; dated May 2015.
Kehoe, B. et al.; Cloud-Based Robot Grasping with the Google Object Recognition Engine; IEEE International Conference on Robotics and Automation; 8 pages; dated May 2013.
Lenz, I. et al.; Deep learning for detecting robotic grasps; The International Journal of Robotics Research, pp. 705-724; dated Aug. 21, 2014.
Levine, S. et al.; Learning hand-eye coordination for robotic grasping with deep learning and large-scale data collection; The International Journal of Robotics Research; pp. 421-436; dated 2018.
Miller, A.T. et al.; Graspit! a versatile simulator for robotic grasping; IEEE Robotics & Automation Magazine; pp. 110-122; dated 2004.
Nguyen, Anh et al.; Detecting Object Affordances with Convolutional Neural Networks; IEEE; 6 pages; dated 2016.
Pinto, L. et al.; Supersizing self-supervision: Learning to grasp from 50k tries and 700 robot hours; IEEE; 8 pages; dated 2015.
Sadeghi, F. et al.; Sim2Real Viewpoint Invariant Visual Servoing by Recurrent Control; In Proceedings of the IEEE Conference on Computer Vision and Patterns Recognition; pp. 4691-4699; dated 2018.
Tobin, J. et al.; Domain randomization for transferring deep neural networks from simulation to the real world; IEEE; 8 pages; dated Mar. 20, 2017.
Varley, J. et al.; Generating multi-fingered robotic grasps via deep learning; IEEE/RSJ International Comference on Intelligent Robots and Systems; 8 pages; dated 2015.
Veres, M. et al.; Modeling Grasp Motor Imagery through Deep Conditional Generative Models; IEEE Robotics and Automation Letters; pp. 1-8; dated Jan. 11, 2017.
Yan, M. et al.; Learning probabilistic multi-modal actor models for vision-based robotic grasping; International Conference on Robotics and Automation; dated Apr. 15, 2019.
Zeng, A. et al.; Robotic pick-and-place of novel objects in clutter with multi-affordance grasping and cross-domain image matching; The International Journal of Robotics Research; pp. 1-16; dated 2018.
Goldfeder, C.; Data-driven grasping; Autonomous Robots; 161 pages; dated 2011.
Ciocarlie, M. et al.; Towards reliable grasping and manipulation in household environments; In Experimental Robotics; pp. 1-12; dated 2014.
Mahler, J. et al.; Dex-Net 2.0: Deep Learning to Plan Robust Grasps with Synthetic Point Clouds and Analytic Grasp Metrics; 12 pages; dated Aug. 8, 2017.
Rubinstein, R.; The Cross-entropy Method for Combinatorial and Continuous Optimization; Methodology and Computing in Applied Probability; Pates 1-69; dated 1999.
E.Coumans et al.; Pybullet a python module for physics simulation for games, robotics and machine learning. GitHub repository, 4 pages; dated 2016.
Yan, X. et al., "Data-Efficient Learning for Sim-to-Real Robotic Grasping Using Deep Point Cloud Prediction Networks;" Cornell University; arXiv.org; arXiv:1906.08989v1; 10 pages; Jun. 21, 2019.
Patchaikani, P. et al., "A Single Network Adaptive Critic-Based Redundancy Resolution Scheme for Robot Manipulators;" IEEE Transactions on Industrial Electronics, vol. 59, No. 8; 13 pages; Aug. 2012.
European Patent Office; International Search Report and Written Opinion of PCT Ser. No. PCT/US2020/050827; 11 pages; dated Jan. 12, 2021.

* cited by examiner

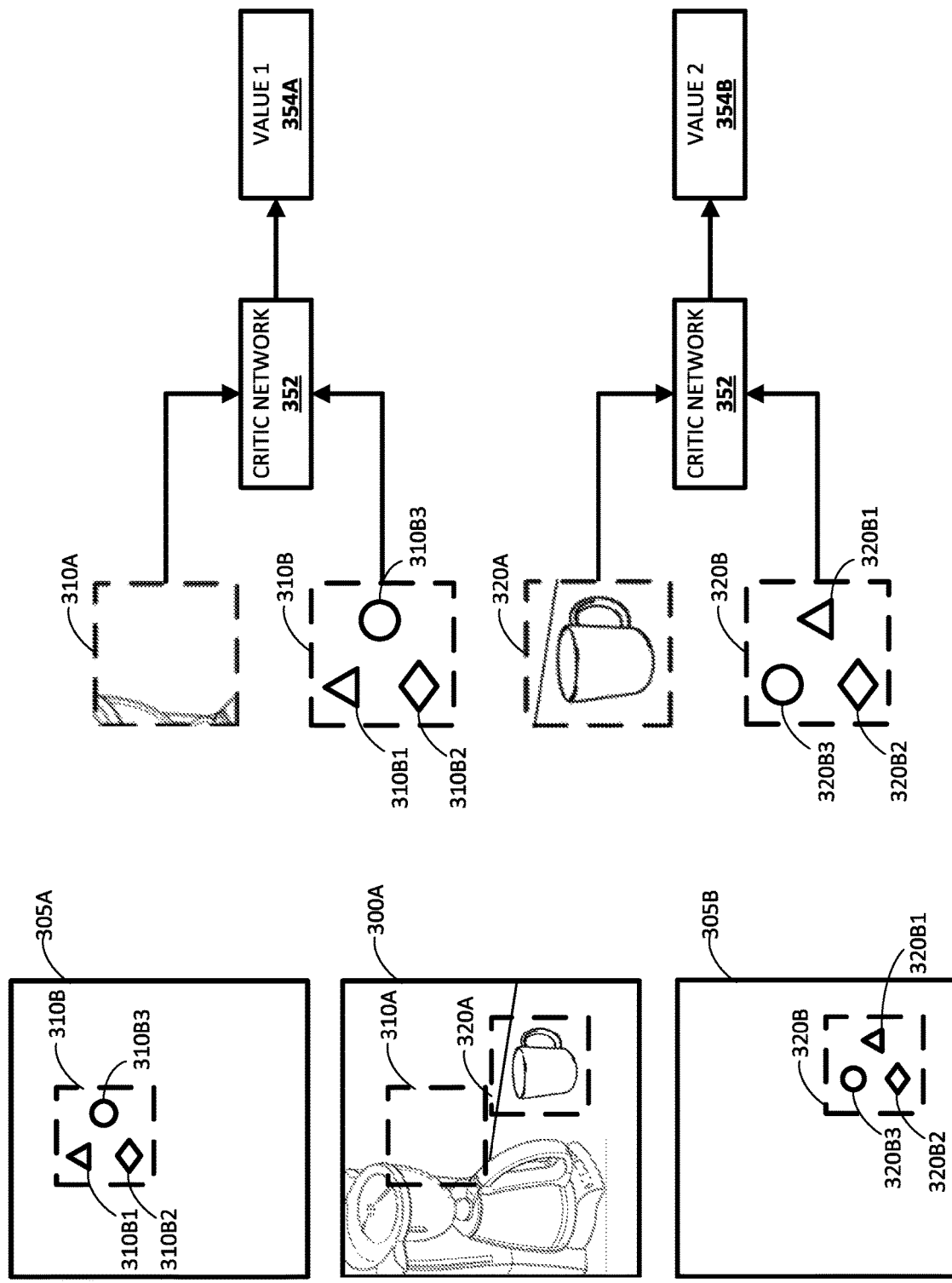

ROBOTIC CONTROL USING ACTION IMAGE(S) AND CRITIC NETWORK

BACKGROUND

Techniques have been proposed for training a critic network (e.g., a trained neural network model approximating a state-action value function) that, when trained, can be utilized by a robot in performing a robotic task in which the robot interacts with one or more environmental objects. Such a robotic task can be robotic grasping, or other non-grasping robotic task such as opening a door, throwing a ball, pushing objects, etc.

In performing the robotic task, the trained critic network can be used to process state-action pairs that each include current vision data (e.g., a red, blue, green (RGB) image), along with a corresponding one of N sampled candidate actions (e.g., sampled using the cross-entropy method (CEM) and/or other technique(s)). The candidate actions are represented as a vector in task-space. For example, a candidate end effector action can be represented as a vector with five values, three of which define a three-dimensional (3D) translation of the end effector, and two values representing a sine-cosine encoding of the change in orientation of the end effector about an axis of the end effector. A corresponding value is generated for each of the sampled candidate actions based on the processing of the sampled candidate action and the robot state data. The candidate action corresponding to the best generated value can be selected for implementation by the robot. Upon completion of implementing the candidate action, the process can then be repeated to select a next candidate action to be implemented by the robot. This can continue until, for example, a termination condition is encountered, thereby enabling a sequence of actions to be sequentially selected and sequentially implemented in performing the robotic task.

SUMMARY

Implementations disclosed herein are directed to generating and utilizing action image(s) that represent a candidate pose (e.g., a candidate end effector pose), in determining whether to utilize the candidate pose in performance of a robotic task. The action image(s) and corresponding current image(s) can be processed, using a trained critic network, to generate a value that indicates a probability of success of the robotic task if component(s) of the robot are traversed to the candidate pose. When the value satisfies one or more conditions (e.g., satisfies a threshold), the robot can be controlled to cause the component(s) to traverse to the particular pose in performing the robotic task. For example, if the robotic task is grasping and the component is a grasping end effector, the end effector can be traversed to the pose, then digits of the end effector closed to attempt the grasp. Implementations disclosed herein additionally or alternatively relate to training a critic network that can be utilized to process action image(s), that represent a candidate pose of robotic component(s), and corresponding current image(s), to generate a corresponding value that indicates a probability of success of a robotic task if the component(s) are the traversed to the candidate pose.

An action image includes projections, for N points of a component (e.g., an end effector) for a particular pose of the component, onto a vision frame of a vision component of the robot. In other words, the action image can include value(s), for certain pixels, where by having the value(s) the certain pixels indicate locations of the N points, in the vision frame, when the component is in the particular pose. The pixels that are not the certain pixels can have value(s), such as zero or null, that indicate they do not correspond to any of the N points.

As one example, assume that N=3, that the action image has three channels, that the component is a two digit/finger end effector, and that the N points correspond to: a tip of the first digit, a tip of the second digit, and a point near pivot point(s) of the first and second digits. For a first pose of the end effector, 3D locations for those three points can be determined in a robot frame and projected onto a vision frame through transformation(s) available from robot kinematics. Each of the N points can be projected to a corresponding pixel in a corresponding channel. For instance, the tip of the first digit can always be represented in a first channel and a particular pixel in the first channel, that corresponds to the 3D location of the tip of the first digit at the first pose, can be set to a value of "1". All other pixels in the first channel can be set to a value of "0". Further, the tip of the second digit can always be represented in a second channel and a particular pixel in the second channel, that corresponds to the 3D location of the tip of the second digit at the first pose, can be set to a value of "1". All other pixels in the second channel are set to a value of "0". Yet further, the point near pivot point(s) can always be represented in a third channel and a particular pixel in the third channel, that corresponds to the 3D location of the point near pivot point(s) at the first pose, can be set to a value of "1". All other pixels in the channel are set to a value of "0". Accordingly, the pixels with the "1" value in the three channels (i.e., one pixel in each channel) collectively represent the first pose. Action images can likewise be generated for additional disparate end effector poses, and will have different combinations of pixels with the "1" value in the three channels.

The example, in the preceding paragraph, of setting a value of a pixel to "1" in a channel, while setting the other pixels in the channel to "0" is an example of a channel that includes a "one-hot" pixel. However, it is to be understood that "a channel that includes a one-hot pixel", as used herein, is not restricted to the example of the preceding paragraph. Rather, it generally encompasses setting all pixels in a channel to the same value, but for a particular pixel that is set to an alternate value. As a particular example, "a channel that includes a one-hot pixel" also encompasses setting a value of a pixel to "0" in a channel, while setting all other pixels in the channel to "1". Although that particular example is sometimes referenced as "one-cold", it is encompassed under the definition of "one-hot" as used herein. As another particular example, "a channel that includes a one-hot pixel" also encompasses setting a value of a pixel in a channel to "16", "128", or other value—while setting all the other pixels to "0", "1", or other value. For that particular example, the value (e.g., 16 or 128) can optionally encode additional information such as, for example a depth value for the corresponding point and/or for the end effector as a whole. For instance, the depth value can be relative to the robot frame or other reference frame, and the value can correspond to the depth value (e.g., larger numbers corresponding to depth that is farther away) of the point or of a center point of the end effector.

Other representations of a candidate pose in an action image are contemplated, and can be implemented in implementations disclosed herein. As one example, a channel of an action image can include multiple hot pixels, each having a different hot value and each corresponding to a different point of an end effector. For instance, assume that corresponding 3D locations of a first point, a second point, and a third point of an end effector, at a particular pose of the end effector, are to be projected onto a vision frame. The action image can have a single channel and the pixel corresponding to the projection of the first point can be set to a first value corresponding to the first point (e.g., "32"), the pixel corresponding to the projection of the second point can be set to a second value corresponding to the second point (e.g., "64"), the pixel corresponding to the value of the third point can be set to a third value corresponding to the third point (e.g., "128"), and all other pixels can be set to a default value (e.g. "0"). In other words, in such an instance the action images could all be single channel images, with the single channel having corresponding hot pixels with the first value, the second value, and the third value—corresponding to respective projections of the first point, the second point, and the third point. In these and other manners the three points can all be represented in a single channel, while being differentiable by virtue of being represented by different values. The different values utilized to represent the different points can be the same across all action images. In other words, the first point can always be represented by the first value, the second point can always be represented by the second value, and the third point can always be represented by the third value.

Accordingly, implementations disclosed herein represent a particular end effector pose as an action image, where certain valued pixels in the action image each indicate where a corresponding point, of the end effector, would be in the vision frame if the end effector were in the particular end effector pose. It is noted that in such a representation, and when a vision component has an adjustable pose (i.e., adjustable relative to a robot frame), the same action image can represent two disparate end effector poses for two different vision component poses (i.e., two different vision frames). In other words, projecting a first end effector pose into a first vision frame (when the vision component is in a first pose) can result in a particular action image, and projecting a disparate second end effector pose into a second vision frame (when the vision component is in a second pose) could lead to the same particular action image. This is because the end effector pose is being transformed to the vision frame, which can change in dependence on the relative pose of the vision component. In these and other manners, the critic network can be trained more quickly and/or be more accurate as the action image provides a representation of the end effector pose in a manner that is consistent with the current vision component pose.

Representing end effector (and/or other robotic component) poses through action images can achieve various benefits. For example, such a representation can enable training of the critic network based largely (or even exclusively) on simulated data from simulated robotic task episodes, while still achieving a high success rate (e.g., greater than 90%) for the robotic task in the real world—even for objects and/or environments that are disparate from those of the simulated robotic task episodes. For instance, training of the critic network with the action image representation, and based solely on simulated data, can result in a high robotic task success rate in the real world. For instance, the robotic task success rate can be higher than compared to training of an alternate critic network based solely on real world data and with an alternate grasp pose representation that is not in the vision frame and that includes 3 values that represent a 3D location in task space and 2 values that represent orientation in task space. Also, for example, such a representation can enable training of the critic network with a lesser quantity of training instances. For instance, training of the critic network with the action image representation can result in a high success rate for the robotic task with a fraction of the training instances as compared to training of an alternate critic network with an alternate grasp pose representation.

In some implementations, training the critic network can be based on supervised or semi-supervised labeling of simulated and/or real robotic task training episodes in which the robotic task is attempted. As one example, where the robotic task is grasping, grasp training episodes can be used in which grasps are attempted. For example, a large quantity (e.g., 50,000; 100,000; 500,000; or more) grasp training episodes can be performed in simulation and/or the real world using scripted movements, random movements, partially trained version of the critic network described herein, other grasping networks, and/or other techniques. For instance, in a grasp training episode random movements can be performed to move a grasping end effector from a starting pose to a pre-grasp pose, then the grasping end effector "closed" to attempt a grasp. Further, a pre-grasp pose can be stored for each of the grasp training episodes, along with image(s) (simulated or real) that preceded the pre-grasp pose, and a grasp success label for the grasp training episode. The grasp success label for the grasp training episode can be, for example, successful or not successful. In a simulated environment, the grasp success label can be determined by, for example, lifting the end effector after the grasp attempt (while digits still closed) and determining if a simulated object is also lifted along with the end effector. In a real world environment, the grasp success label can be determined utilizing various techniques. For example, it can be determined by lifting the end effector after the grasp attempt, moving the end effector toward a vision component of the robot, and analyzing corresponding vision data to determine if the end effector is holding an object. Also, for example, it can be determined by lifting the end effector after the grasp attempt, moving it to a different location, then "dropping" any object that may be held. An image of the environment before the grasp attempt can then be compared to another image of the environment after the grasp attempt, to determine whether any objects moved (which, if they did, can indicate successful grasp). Human labeling and/or other techniques can additionally or alternatively be utilized. It is noted that, to increase diversity of the training data, various different environments can be utilized across different grasp training episodes, including different target objects, different background objects, different resting surfaces, different lighting, etc. This can be accomplished by rendering different scenes in simulation and/or altering environments in the real world.

Data from the grasp training episodes can then be utilized to generate training examples for training the critic network. For example, an image from an episode can be selected. An action image can be generated for the training example based on the pre-grasp pose of the episode, optionally taking into account the pose of the vision component at the time the selected image was captured. For instance, the action image can be generated by projecting the pre-grasp pose into a vision frame that corresponds to the selected image (i.e., a vision frame that is based on the pose of the vision component at the time the selected image was captured). The action image can be the projected image itself, or a cropped version thereof (as described herein). A current image can be generated for the training example based on the selected image. The current image can be the same as the selected image, or a crop thereof that corresponds to the crop of the action image. Further, the grasp success label of the episode can be assigned as a label for the training example. The critic network can then be trained based on such a training example, as well as other training examples generated based on the episode and/or other episodes. For example, the current image and the action image can be processed using the critic network to generate a predicted value. The predicted value can then be compared to the grasp success label to generate an error, and the error utilized in updating the critic network (e.g., using backpropagation or other technique). Batch training can optionally be utilized.

In some implementations, in performing a robotic task based on a trained critic network, a current image is captured by a vision component of the robot. The vision component can be for example, a monographic camera (e.g., generating 2D RGB images), a stereographic camera (e.g., generating 2.5D RGB-D images), and/or a laser scanner (e.g., generating a 2.5D depth (D) image). As described herein, the structure of the critic network can be adapted for various types of images based on various types of vision data, and training and use of the critic network can be adapted accordingly.

Further, in performing the robotic task, initial candidate poses can be determined based on sampling of poses within a current workspace of the robot, such as uniform sampling of available poses with the current workspace. The workspace can be the portion of the environment that is within a field of view of the vision component at the time the current image is captured. A corresponding action image can be generated for each of the determined initial candidate poses, optionally taking into account the pose of the vision component when the current image is captured.

In some implementations, each of the action images is cropped using a corresponding frame that encompasses, and is optionally centered on, the corresponding pixels of the action image that correspond to the corresponding initial candidate poses represented by the action image. Further, in those implementations, a corresponding crop of the current image is generated for each of the cropped action images. For instance, a first cropped action image that is a crop of a first of the action images can include a first set of pixels from the first action image and the crop of the current image can be a crop of the corresponding first set of pixels, for the current image. Also, for instance, a second cropped action image that is a crop of a second of the action images can include a second set of pixels from the second action image and the crop of the current image can be a crop of the corresponding second set of pixels, for the current image. The cropped action images and cropped current images can optionally be resized (e.g., increased in size) after cropping.

Each cropped action image, cropped current image pair is then processed, using the critic network, to generate a corresponding value. If any of the values satisfies a threshold (e.g., a fixed threshold), the initial candidate pose corresponding to that value can then be used to control the robot to traverse to the initial candidate pose in performing a robotic action. For example, if the robotic action is grasping, a grasp can be attempted (e.g., digits closed) after traversing to the initial candidate pose.

However, if none of the initial values satisfies the threshold, then one or more of the best (e.g., closest to the threshold) values can be identified, and corresponding candidate pose(s) used in sampling additional candidate poses. For example, the additional candidate poses can be sampled from a Gaussian distribution around one of the corresponding candidate pose(s) having the best value(s). The additional candidate poses can then be used in generating additional action images, and crops thereof. Further, corresponding crops of the current image can be generated. The additional cropped action image, cropped current image pairs can then each be processed, using the critic network, to generate a corresponding value. If any of those values satisfies the threshold, the additional candidate pose corresponding to that value can then be used to control the robot to traverse to the additional candidate pose in performing a robotic action. However, if none of the additional values satisfies the threshold, then one or more of the best (e.g., closest to the threshold) values can be identified, and utilized in sampling yet additional candidate poses. This can be repeated until a value that satisfies the threshold is determined, or other condition(s) are met (at which point the robotic task may fail, or a "best" value, that still doesn't satisfy the threshold, can be used to attempt the robotic task).

The preceding example describes generating cropped versions of the action images and the current image. This can improve training and/or performance of the critic network in various implementations as it enables localizing on the corresponding candidate pose and the corresponding portion(s) of the environment for that corresponding pose. However, in other implementations the action images and the current image may not be cropped. For example, each action image, current image pair can include the same current image (i.e., not cropped) and a different non-cropped action image.

Also, the preceding example describes determining the initial candidate pose based on sampling of poses with a current workspace of the robot. However, in some situations the initial candidate poses can be sampled within a subset of the current workspace. For example, when seeking to grasp a particular object or an object of a particular class, separate object detection and classification can be performed on the current image to determine portion(s) of the current image that contain such object(s). Further, portion(s) of the current workspace that correspond to those portion(s) of the current image can be determined (e.g., using robot kinematics), and the sampling of poses restricted to those portion(s). In these and other manners, the initial candidate poses will be those that are likely to lead to grasping of such object(s). Any further iterations of sampling can likewise be restricted to those portion(s) of the current workspace, or can inherently be restricted based on being sampled from a "best" initial candidate pose that was so restricted.

Further, the preceding example describes action image, current image pairs being processed using the critic network. However, as described herein, in some implementations two or more action image, current image pairs can be processed together using the critic network—where each of the action images of the pair represent the same candidate pose. As one example, two action images, both corresponding to the same candidate pose, can be processed, and two current images both corresponding to the same portion of an environment can be processed. For instance, the first can be an RGB image, and the second a depth image. Further, in those implementations two current images can be processed. For instance, the first can be an RGB image, and the second a depth image.

The above description is provided as an overview of only some implementations disclosed herein. These and other implementations are described in more detail herein, including in the detailed description, the claims, and in the appended paper.

Other implementations may include a non-transitory computer readable storage medium storing instructions executable by one or more processor(s) (e.g., a central processing unit(s) (CPU(s)), graphics processing unit(s) (GPU(s)), and/or tensor processing unit(s) (TPU(s))) to perform a method such as one or more of the methods described herein. Yet other implementations may include a system of one or more computers and/or one or more robots that include one or more processors operable to execute stored instructions to perform a method such as one or more of the methods described herein.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

BRIEF DESCRIPTION OF THE DRAWINGS

FIG. 3 illustrates an example of an initial current image, a first initial action image, and a second initial action image. FIG. 3 further illustrates generating a first value by processing, using a critic network, a first action image that is a crop of the first initial action image and a first current image that is a corresponding crop of the initial current image. FIG. 3 further illustrates generating a second value by processing, using the critic network, a second action image that is a crop of the second initial action image and a second current image that is a corresponding crop of the initial current image.

DETAILED DESCRIPTION

Figure 1:
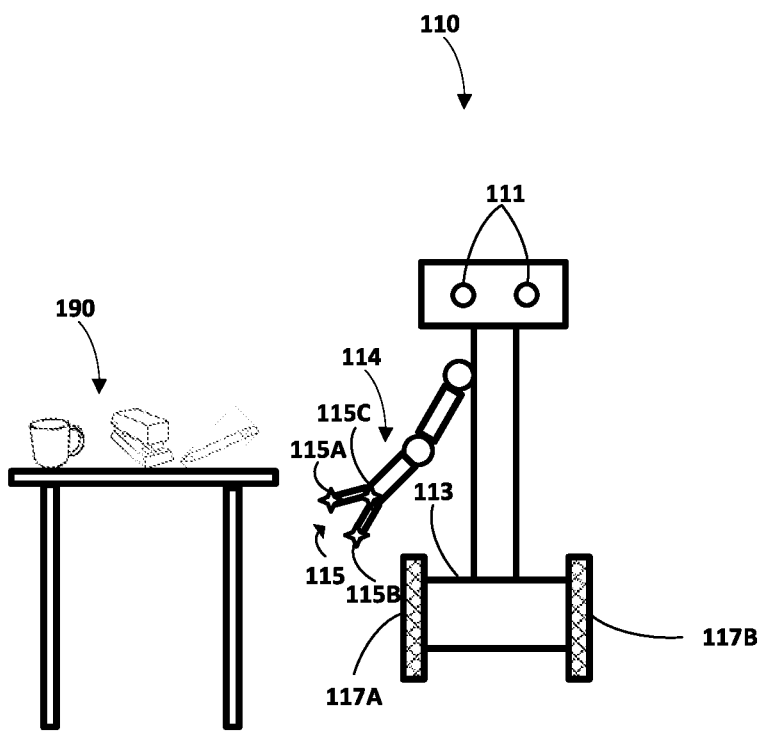
FIG. 1 illustrates an example environment in which implementations disclosed herein can be implemented.

FIG. 1 illustrates an example environment in which implementations disclosed herein can be implemented. The example environment includes a robot 110, and several objects 190 resting on a table. The example environment of FIG. 1 can be a real world environment in which robot 110 can utilize action images and a critic network, according to techniques described herein, in performing robotic tasks directed to the object(s) 190, such as grasping or otherwise manipulating the objects. The example environment can alternatively be a real or simulated environment, in which robot 110 can be utilized to perform task training episodes to generate training data for use in training a critic network according to implementations disclosed herein.

The robot 110 illustrated in FIG. 1 is a particular mobile robot. However, additional and/or alternative robots can be utilized with techniques disclosed herein, such as additional robots that vary in one or more respects from robot 110 illustrated in FIG. 1. For example, a stationary robot arm, a mobile telepresence robot, a mobile forklift robot, an unmanned aerial vehicle ("UAV"), and/or a humanoid robot can be utilized instead, of or in addition to robot 110, in training or inference techniques described herein.

Robot 110 includes a base 113 with wheels 117A, 117B provided on opposed sides thereof for locomotion of the robot 110. The base 113 may include, for example, one or more motors for driving the wheels 117A, 117B of the robot 110 to achieve a desired direction, velocity, and/or acceleration of movement for the robot 110.

Robot 110 also includes a vision component 111 that can generate images related to shape, color, depth, and/or other features of object(s) that are in the line of sight of the vision component 111. The vision component 111 may be, for example, a monocular camera, a stereographic camera (active or passive), and/or a 3D laser scanner. A 3D laser scanner may include one or more lasers that emit light and one or more sensors that collect data related to reflections of the emitted light. The 3D laser scanner may generate vision component data that is a 3D point cloud with each of the points of the 3D point cloud defining a position of a point of a surface in 3D space. A monocular camera may include a single sensor (e.g., a charge-coupled device (CCD)), and generate, based on physical properties sensed by the sensor, images that each includes a plurality of data points defining color values and/or grayscale values. For instance, the monocular camera may generate images that include red, blue, and/or green channels. Each channel may define a value for each of a plurality of pixels of the image such as a value from 0 to 255 for each of the pixels of the image. A stereographic camera may include two or more sensors, each at a different vantage point. In some of those implementations, the stereographic camera generates, based on characteristics sensed by the two sensors, images that each includes a plurality of data points defining depth values and color values and/or grayscale values. For example, the stereographic camera may generate images that include a depth channel and red, blue, and/or green channels.

Robot 110 also includes one or more processors that, for example: provide control commands to actuators and/or other operational components thereof; determine poses of objects based on vision component data and models of those objects; generate control commands for various tasks based at least in part on poses determined utilizing action images and a critic network as described herein; etc. For example, one or more processors of robot 110 may implement all or aspects of method 200 of FIGS. 2A and 2B. Additional description of some examples of the structure and functionality of various robots is provided herein.

The robot 110 also includes robot arm 114 with end effector 115 that takes the form of a gripper with two opposing "fingers" or "digits." Also illustrated in FIG. 1 as stars 115A, 115B, and 115C, are three points on the end effector 115 that can be the points whose 3D locations are determined for various poses, and whose 3D locations for those various poses are used in representing those poses in corresponding action images as described herein. Although three points are illustrated in FIG. 1, and are described in various examples described herein, it is noted that more than three points of the end effector can be represented in action images in various implementations, or even only two points in some implementations.

Figure 2A:
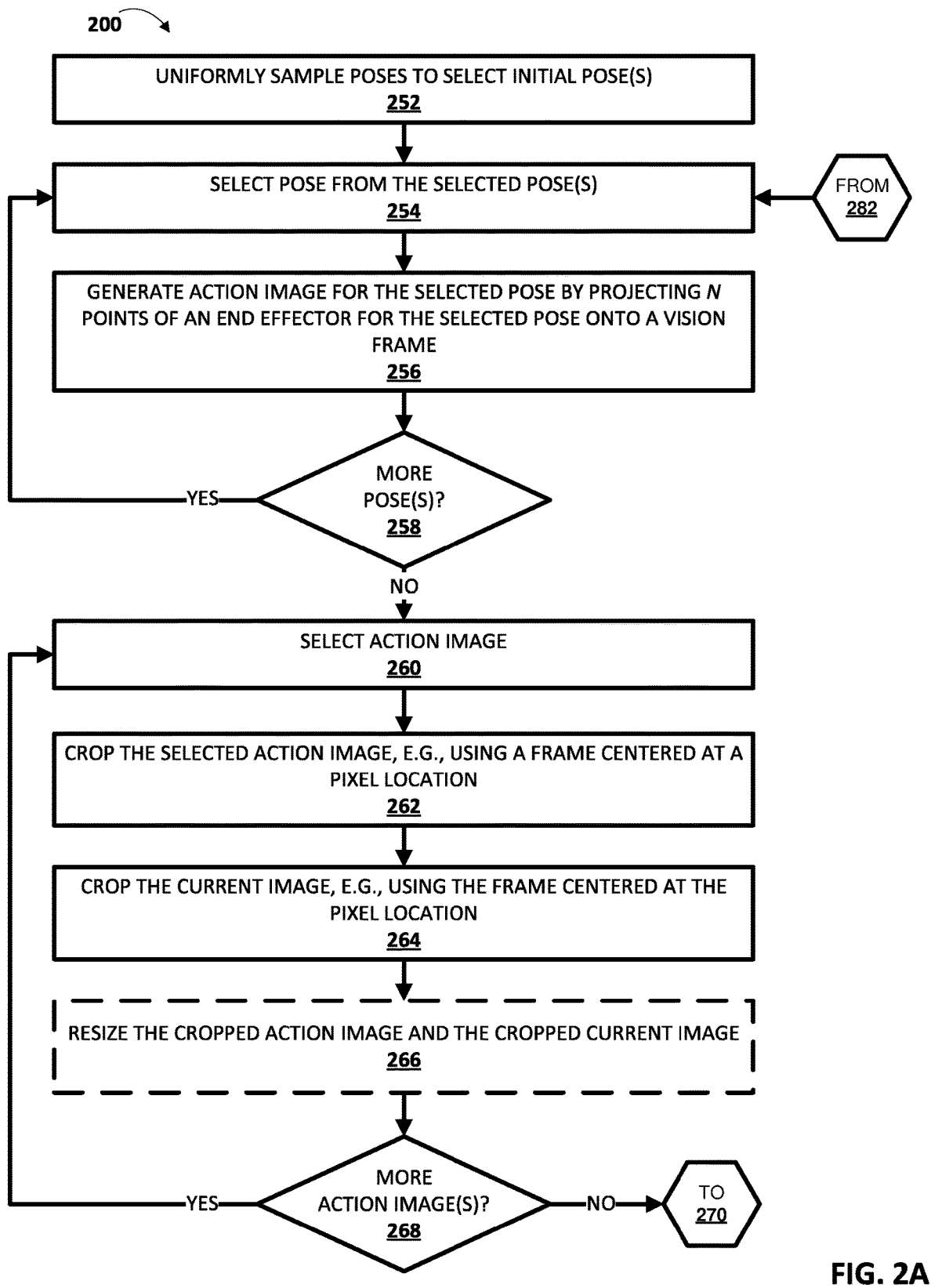
FIG. 2A and FIG. 2B include a flowchart illustrating an example method of using action images and a critic network to determine a pose, for a robotic component, to use in performing a robotic task.
Figure 2B:
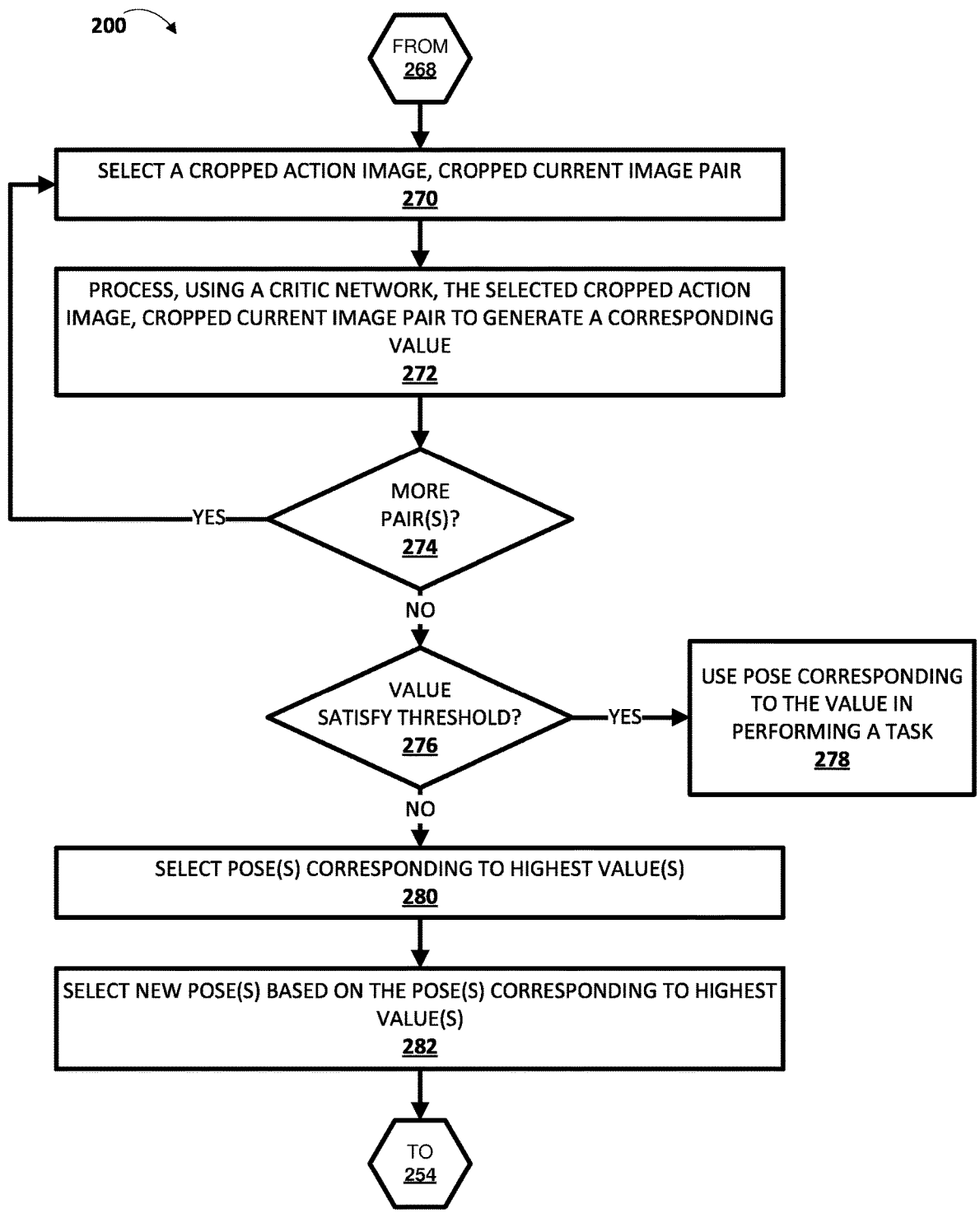

FIGS. 2A-2B are flowcharts illustrating an example method 200 of using action images and a critic network to determine a pose, for a robotic component, to use in performing a robotic task. For convenience, the operations of the flowcharts are described with reference to a system that performs the operations. This system may include one or more components of a robot, such as a processor and/or robot control system of robot 110, robot 820, and/or other robot. Moreover, while operations of method 200 are shown in a particular order, this is not meant to be limiting. One or more operations may be reordered, omitted or added.

At block 252, the system uniformly samples poses to select initial poses. As described herein, the uniform sampling can be from all or portions of a workspace of the robot, such as a workspace that corresponds to a field of view of a vision component of the robot. In some implementations, the uniform sampling can be from subset(s) of the workspace. For example, the subset(s) can be those determined to include target object(s) to be interacted with in performing the robotic task, enabling determining of a pose (in subsequent blocks) that is likely to cause interaction with the target object(s).

At block 254, the system selects a pose from the selected pose(s). At an initial iteration of block 254, this will be from the poses selected at block 252. In any subsequent iterations of block 254, this will be from the pose(s) selected at a most recent iteration of block 282.

At block 256, the system generates an action image from the selected pose by projecting N points, of an end effector and for the selected pose, onto a vision frame. N is a positive integer such as 2, 3, 4, 5, or 6. For example, corresponding 3D locations of the N points 115A-C of end effector 115 of FIG. 1 can be determined for when the end effector 115 is in the selected pose. Further, those 3D locations can be projected onto a vision frame to generate the action image. As one particular example, assume a given grasp candidate s and a vision component that is a camera. Robot kinematics can be used to determine the transform from the end-effector E to a feature point $\xi_k$, denoted as $T_{\xi_k}^E(s)$, and the transform from the robot frame R to the end-effector, denoted as $T_E^R(s)$. Assuming the camera is calibrated to the robot frame, the robot kinematics can be used to find the camera frame C relative to the robot frame as $T_R^C$. Combining these, the location of each feature point in the camera frame can be found based on the equation: $T_{\xi_k}^C(s)=T_R^C T_E^R(s) T_{\xi_k}^E(s)$. These feature points can in turn be projected onto the camera image plane through the camera intrinsic projection matrix.

At block 258, the system determines whether any unprocessed selected pose(s) remain. If, at an iteration of block 258, the decision is yes, the system returns to block 254 to select an unprocessed pose from the selected poses. If, at an iteration of block 258, the decision is no, the system proceeds to block 260. It is noted that iterations of blocks 254 and 256 can optionally occur in parallel.

At block 260, the system selects an action image from the action images generated in iterations of block 256.

At block 262, the system crops the selected action image to generate a cropped action image that encompasses the pixels representing the corresponding selected pose of the action image. For example, the system can crop the selected action image using a frame centered at a pixel location, based on the corresponding pose. For instance, in generating the crop, the frame can be centered at a pixel that is equidistant to all of the pixels that represent the N points, for the corresponding pose, in the action image.

At block 264, the system crops a current image, in the same manner that the selected action image was cropped, to generate a cropped current image. For example, the system can crop the current image using the frame centered at the same pixel location at which the action image was cropped.

At optional block 266, the system resizes the cropped action image and the cropped current image.

At block 268, the system determines whether any action image(s) remain unprocessed. If, at an iteration of block 268, the decision is yes, the system returns to block 260 to select an unprocessed action image. If, at an iteration of block 268, the decision is no, the system proceeds to block 270. It is noted that iterations of blocks 260, 262, 264, 266, and 268 can optionally occur in parallel. For example, a first iteration of those blocks can be performed in processing a first action image and a second iteration of those blocks can be performed, in parallel with the first iteration, in processing a second action image.

At block 270, the system selects a cropped action image, cropped current image pair.

At block 272, the system processes, using a critic network, the selected cropped action image, cropped current image pair to generate a corresponding value.

At block 274, the system determines whether any unprocessed cropped action image, cropped current image pair(s) remain. If, at an iteration of block 274, the decision is yes, cropped current image pair(s), the system returns to block 270 to select another cropped action image, cropped current image pair. If, at an iteration of block 274, the decision is no, the system proceeds to block 276. It is noted that iterations of blocks 270, 272, and 274 can optionally occur in parallel. Further, it is noted that a corresponding cropped action image, cropped current image pair is described for each considered pose. However, as described herein, for each considered pose multiple (e.g., 2) cropped action image, cropped current image pairs can be generated and processed using the critic network. For example, two pairs can be generated and processed for RGB-D vision data as described herein.

At block 276, the system determines whether any one of the values generated at iterations of block 272 satisfies a threshold, such as a fixed threshold. If, at an iteration of block 276, the system determines a given one of the values generated at block 272 satisfies the threshold, the system proceeds to block 278 and uses a pose corresponding to the value in performing a task. If, at an iteration of block 276, the system determines none of the corresponding values generated at block 272 satisfy the threshold, the system proceeds to block 280.

At block 280, the system selects one or more poses corresponding to the highest (in implementations where "higher"="better") values generated at block 272.

At block 282, the system selects one or more new poses based on the one or more poses corresponding to the highest value(s). For example, the system can select one or more new poses based on sampling additional poses that are near the pose(s) corresponding to the highest value(s). The system the returns to block 254. This can repeat until block 278 is encountered in an iteration, or until other condition(s) are met. For example, the other condition(s) can include performance of at least a threshold quantity of iterations of block(s) of FIG. 2B, at which point the considered pose corresponding to the best value can be selected and used in performing the task, despite not satisfying the threshold considered in block 276. Moreover, it is noted that when block 278 is encountered, method 200 may restart—to either determine an additional pose for the same iteration of performing the robotic task—or to determine a pose for an additional iteration of performing the robotic task (e.g., directed to a new object).

FIG. 3 illustrates an example of an initial current image 300A, a first initial action image 305A, and a second initial action image 305B. The initial current image 300A illustrates a coffee maker and a coffee mug.

The first initial action image 305A includes indications of three pixels 310B1, 310B2, and 310B3 that collectively represent a first pose of an end effector, as projected into the vision frame of the vision component that captured the initial current image 300A. It is noted that the pixels indicated by the indications 310B1, 310B2, and 310B3 can each be in a different channel of action image 305A. For example, 310B1 can be a one-hot pixel in a first channel, and can correspond to a projection, onto the vision frame, of a first 3D location of a first point of an end effector when at the first pose. Also, for example, 310B2 can be a one-hot pixel in a second channel, and can correspond to a projection, onto the vision frame, of a second 3D location of a second point of the end effector when at the first pose. Also, for example, 310C2 can be a one-hot pixel in a third channel, and can correspond to a projection, onto the vision frame, of a third 3D location of a third point of the end effector when at the first pose.

The second initial action image 305B includes indications of three pixels 320B1, 320B2, and 320B3 that collectively represent a second pose of the end effector, as projected into the vision frame of the vision component that captured the initial current image 300A. The pixels indicated by the indications 320B1, 320B2, and 320B3 can also each be in a different channel of action image 305B. For example, 320B1 can be a one-hot pixel in a first channel, and can correspond to a projection, onto the vision frame, of a fourth 3D location of the first point of an end effector when at the second pose. Also, for example, 320B2 can be a one-hot pixel in a second channel, and can correspond to a projection, onto the vision frame, of a fifth 3D location of a second point of the end effector when at the second pose. Also, for example, 320C2 can be a one-hot pixel in a third channel, and can correspond to a projection, onto the vision frame, of a sixth 3D location of a third point of the end effector when at the second pose.

A first action image 310B that is a crop of the first initial action image 305A is also illustrated, and can be a crop using a frame positioned as indicated by dashed lines within first action image 305A. A first current image 310A that is a crop of the initial current image 300A is also illustrated. It can be a crop using the frame as positioned in generating the crop of the first action image 310B. In other words, the first current image 310A uses the same crop as the first action image 310B. A second action image 320B that is a crop of the second initial action image 305B is also illustrated, and can be a crop using a frame positioned as indicated by dashed lines within second action image 305B. A second current image 320A that is a crop of the initial current image 300A is also illustrated. It can be a crop using the frame as positioned in generating the crop of the second action image 320B. In other words, the second current image 320A uses the same crop as the second action image 320B.

FIG. 3 further illustrates generating a first value 354A by processing, using a critic network 352, the first action image 310B that is the crop of the first initial action image 305A and the first current image 310A that is the corresponding crop of the initial current image 300A. FIG. 3 further illustrates generating a second value 354B by processing, using the critic network 352, the second action image 320B that is a crop of the second initial action image 305B and the second current image 320A that is a corresponding crop of the initial current image 300A. As described herein, values 354A and 354B can be evaluated to determine whether to traverse an end effector to a corresponding pose for one of those values. For example, if value 354A satisfies one or more conditions, and end effector can be traversed to the second pose corresponding to value 354B (i.e., the second pose represented by action image 305B). For instance, if value 354B satisfies a fixed threshold, and is a better value than 354A and any other values generated based on additional action image(s) generated for additional pose(s), then the first pose can be selected and implemented.

Figure 4A:
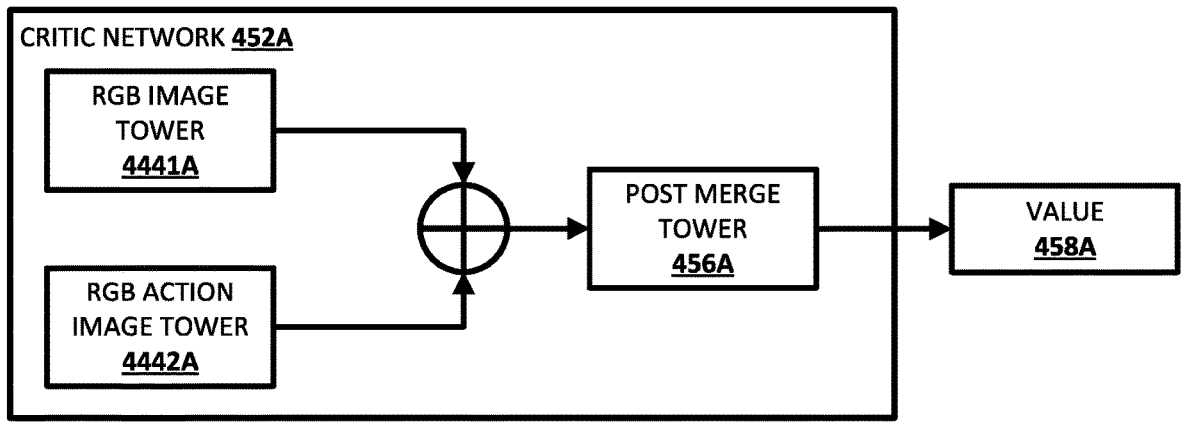
FIG. 4A, FIG. 4B, and FIG. 4C each illustrate an example of a critic network according to implementations disclosed herein.
Figure 4B:
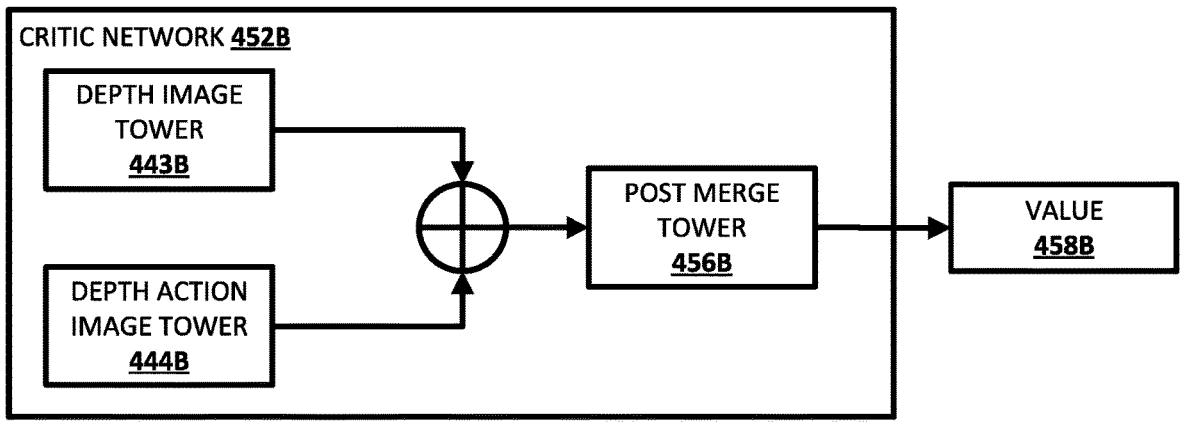
Figure 4C:
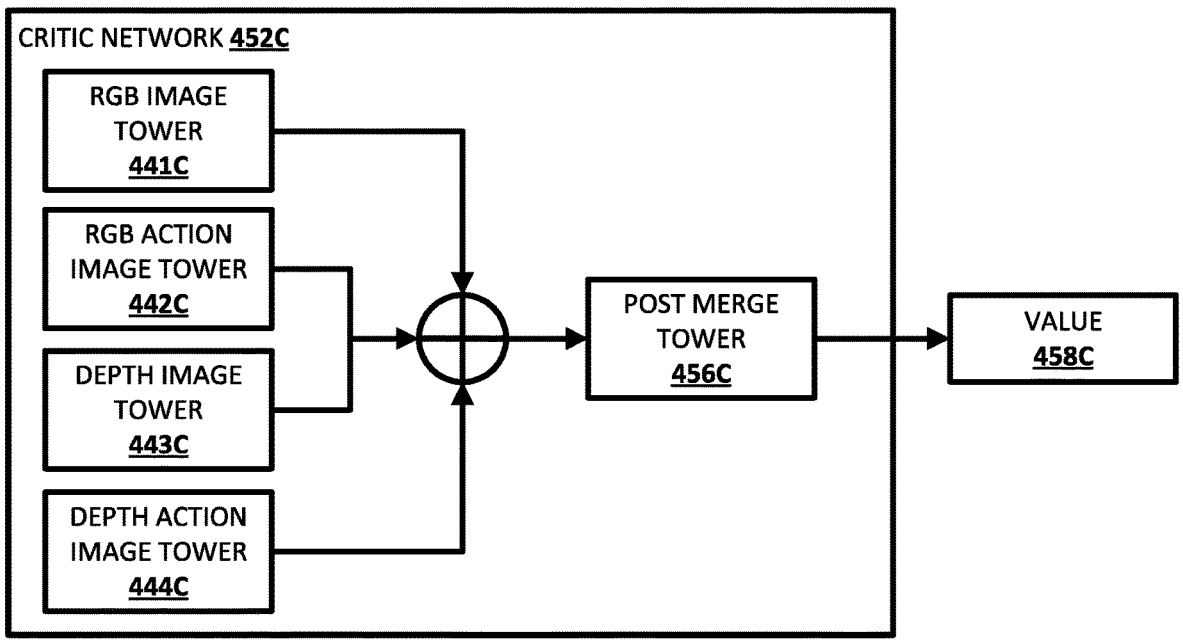

FIGS. 4A, 4B, and 4C each illustrate an example of a critic network according to implementations disclosed herein. Which critic network is utilized in a particular implementation can depend upon the type of vision data to be processed.

The critic network 452A of FIG. 4A can be used in processing RGB vision data, and includes an RGB image tower 441A that processes current RGB images, an RGB action image tower 442A that processes RGB action images, and a post merge tower 456A that processes outputs from the two towers 441A and 442A, after they are merged, to generate a corresponding value 458A. For example, the outputs from the two towers can be merged by concatenating the outputs, as indicated by the circle that encloses a plus sign in FIG. 4A.

The critic network 452B of FIG. 4B can be used in processing depth vision data, and includes a depth image tower 443B that processes current depth images, a depth action image tower 444B that processes depth action images, and a post merge tower 456B that processes outputs from the two towers 443B and 444B, after they are merged, to generate a corresponding value 458B.

The critic network 452C of FIG. 4C can be used in processing RGB-D vision data, and includes an RGB image tower 441C that processes current RGB images, an RGB action image tower 442C that processes RGB action images, a depth image tower 443C that processes current depth images, a depth action image tower 444C that processes depth action images, and a post merge tower 456C that processes outputs from the four towers 441C, 442C, 443C, and 444C, after they are merged, to generate a corresponding value 458C. For example, the outputs from the four towers can be merged by concatenating the outputs, as indicated by the circle that encloses a plus sign in FIG. 4C.

Each of the towers of FIGS. 4A-4C can include, for example, convolutional layers, pooling layers, and/or other layers. The structure of the towers can differ. For example, the depth towers can have different structures than the RGB towers. The post merge towers can include, for example, convolutional layers, pooling layers, and/or other layers.

Figure 5:
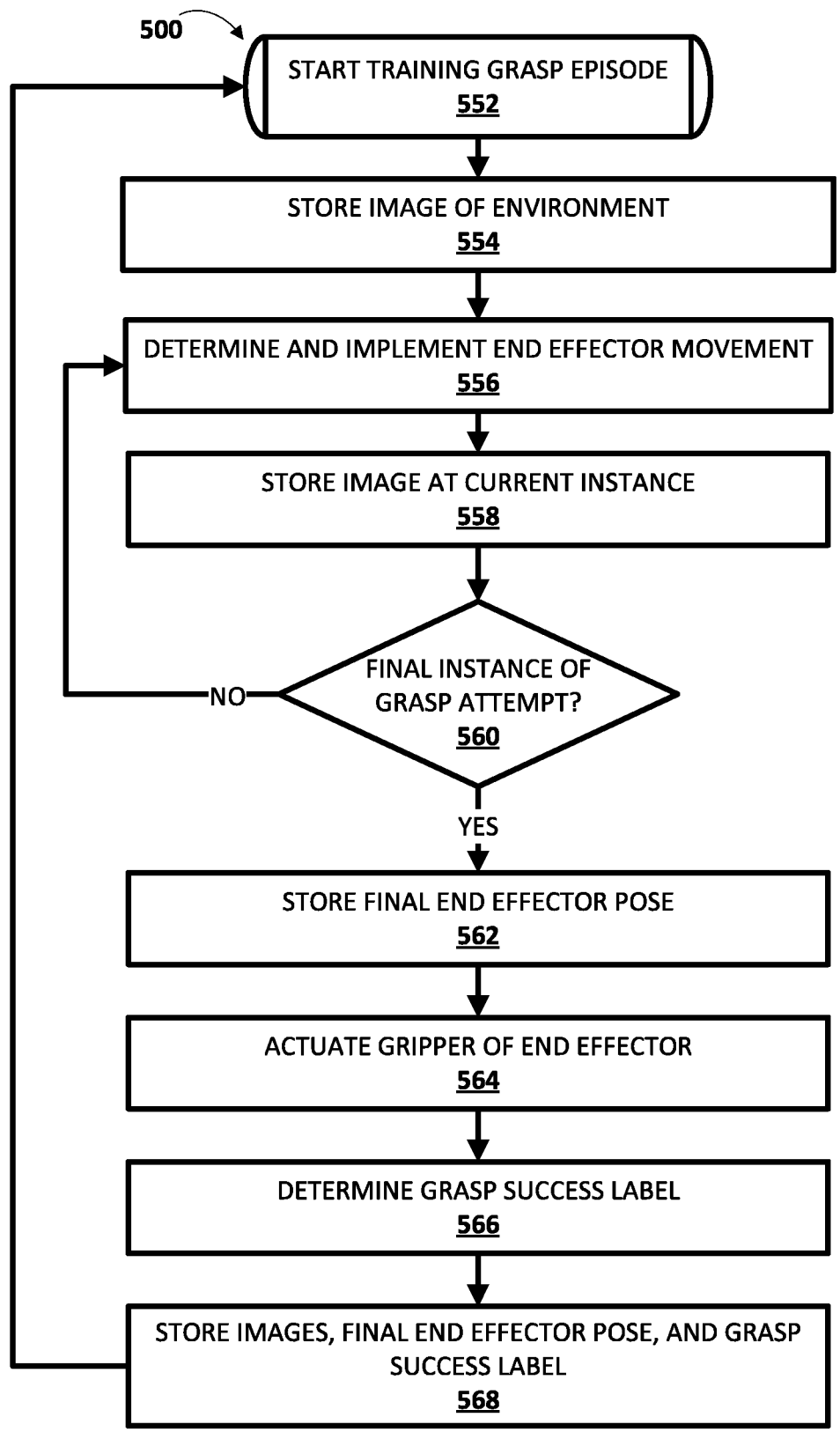
FIG. 5 is a flowchart illustrating an example method of performing grasp training episodes and storing data associated with the grasp training episodes.

FIG. 5 is a flowchart illustrating an example method 500 of performing grasp training episodes and storing data associated with the grasp training episodes. For convenience, the operations of the flowcharts are described with reference to a system that performs the operations. This system may include one or more components of a robot and/or one or more components of a robot simulator. Moreover, while operations of method 500 are shown in a particular order, this is not meant to be limiting. One or more operations may be reordered, omitted or added.

At block 552, the system starts a training grasp episode.

At block 554, the system stores an image of an environment.

At block 556, the system determines and implements an end effector movement. For example, the system may generate one or more motion commands to cause one or more of the actuators that control the pose of the end effector to actuate, thereby changing the pose of the end effector. In some implementations or iterations of block 556, the end effector movement can be random and/or generated based on a scripted policy. In some implementations or iterations of block 556, the end effector movement can be generated using an initially trained version of a critic network and utilizing techniques described herein (e.g., generating and considering action images). For example, initial iterations of block 556 can be random or scripted, then subsequent iterations can utilize progressively updated versions of the critic network to generate on policy data.

At block 558, the system stores an image at a current instance.

At block 560, the system determines whether the end effector movement at block 556 is a final instance of a grasp attempt. For example, the system can determine the end effector movement is a final instance if a threshold quantity of instances have been implemented in the grasp attempt and/or if a threshold quantity of time has passed in the grasp attempt. As another example, the system can additionally or alternative determine the end effector movement is a final instance if, when the critic network is being used in the grasp attempt, the value (generated using the critic network) for an action image of the instance, satisfies a threshold value. If, at an iteration of block 560, the system determines the end effector movement at block 556 is not a final instance of a grasp attempt, then the system returns to block 556 to determine and implement another end effector movement. If, at an iteration of block 560, the system determines the end effector movement at block 556 is a final instance of a grasp attempt, then the system proceeds to block 562.

At block 562, the system stores a final end effector pose. This can, for example, be a pre-grasp pose of the end effector pose right before attempting the grasp (e.g., before closing digits of the end effector).

At block 564, the system actuates a gripper of an end effector.

At block 566, the system determines a grasp success label.

At block 568, the system stores images, the final end effector pose, and the grasp success label, and the system returns to block 562 to start another training grasp episode.

Figure 6:
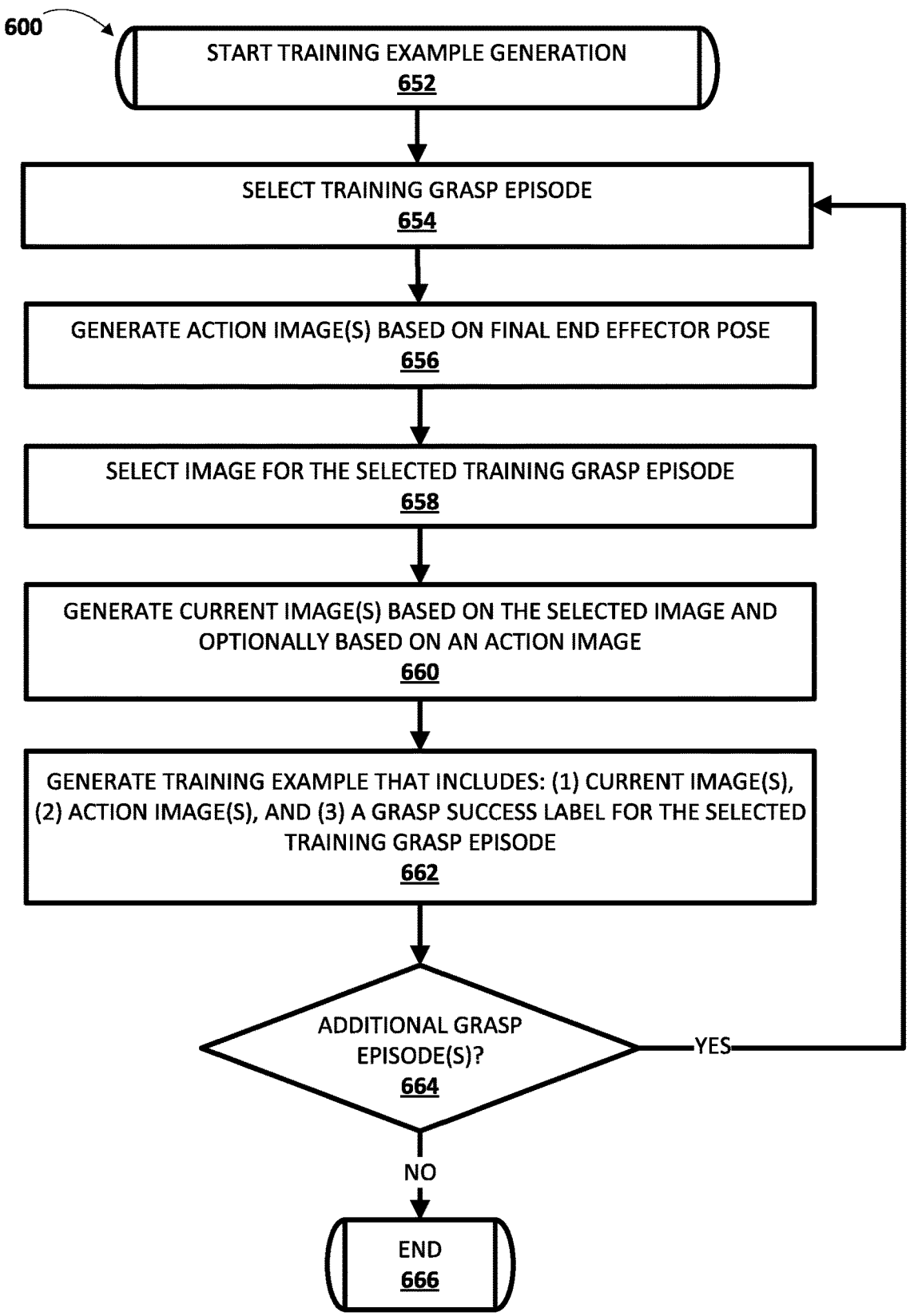
FIG. 6 is a flowchart illustrating an example method of generating training examples based on the data generated in the method of FIG. 5.

FIG. 6 is a flowchart illustrating an example method 600 of generating training examples based on the data generated in the method of FIG. 5. For convenience, the operations of the flowcharts are described with reference to a system that performs the operations. This system may include one or more components of computing device(s), such as a processor of computing device 910 and/or other computing device(s). Moreover, while operations of method 600 are shown in a particular order, this is not meant to be limiting. One or more operations may be reordered, omitted or added.

At block 652, the system starts training example generation.

At block 654, the system selects a training grasp episode, such as one generated according to method 500 of FIG. 5.

At block 656, the system generates one or more action images based on a final end effector pose of the training grasp episode selected at block 654. The action image(s) each include a projection, onto a vision frame, of 3D locations of end effector points when at the final end effector pose. The action image(s) can also be generated based on a vision component pose, of a vision component that captured the image selected in block 658 (below), when that image was captured. It is noted that in some implementations (e.g., with RGB vision data or depth vision data), only a single action image is generated at block 656 for a final end effector pose. In some other implementations (e.g., with RGB-D) vision data, two action images are generated at block 656 for a final end effect pose (e.g., an RGB action image, and a depth action image).

At block 658, the system selects an image for the selected training grasp episode. For example, the image can be an image from a start of the training grasp episode, or another image that precedes the final grasp pose in the training grasp episode.

At block 660, the system generates one or more current images based on the selected image and optionally based on an action image. For example, the action image(s) generated in block 656 can be cropped as described herein, and the current image(s) can be cropped in a corresponding manner as also described herein. It is noted that in implementation where a single action image is generated in an iteration of block 656, a single corresponding current image will be generated in block 660. Likewise, where two action images are generated in an iteration of block 656, two corresponding current images (e.g., an RGB current image and a depth current image) will be generated in block 660.

At block 662, the system generates a training example that includes: (1) one or more current images, (2) one or more action images, and (3) a grasp success label for the selected training grasp episode.

At block 664, the system determines whether to select an additional training grasp episode. If, at an iteration of block 664, the system determines to select an additional training grasp episode, then the system returns to block 654 to select an additional training grasp episode. If, at an iteration of block 664, the system determines not to select an additional training grasp episode, then the system proceeds to block 666 and the method 600 ends.

Figure 7:
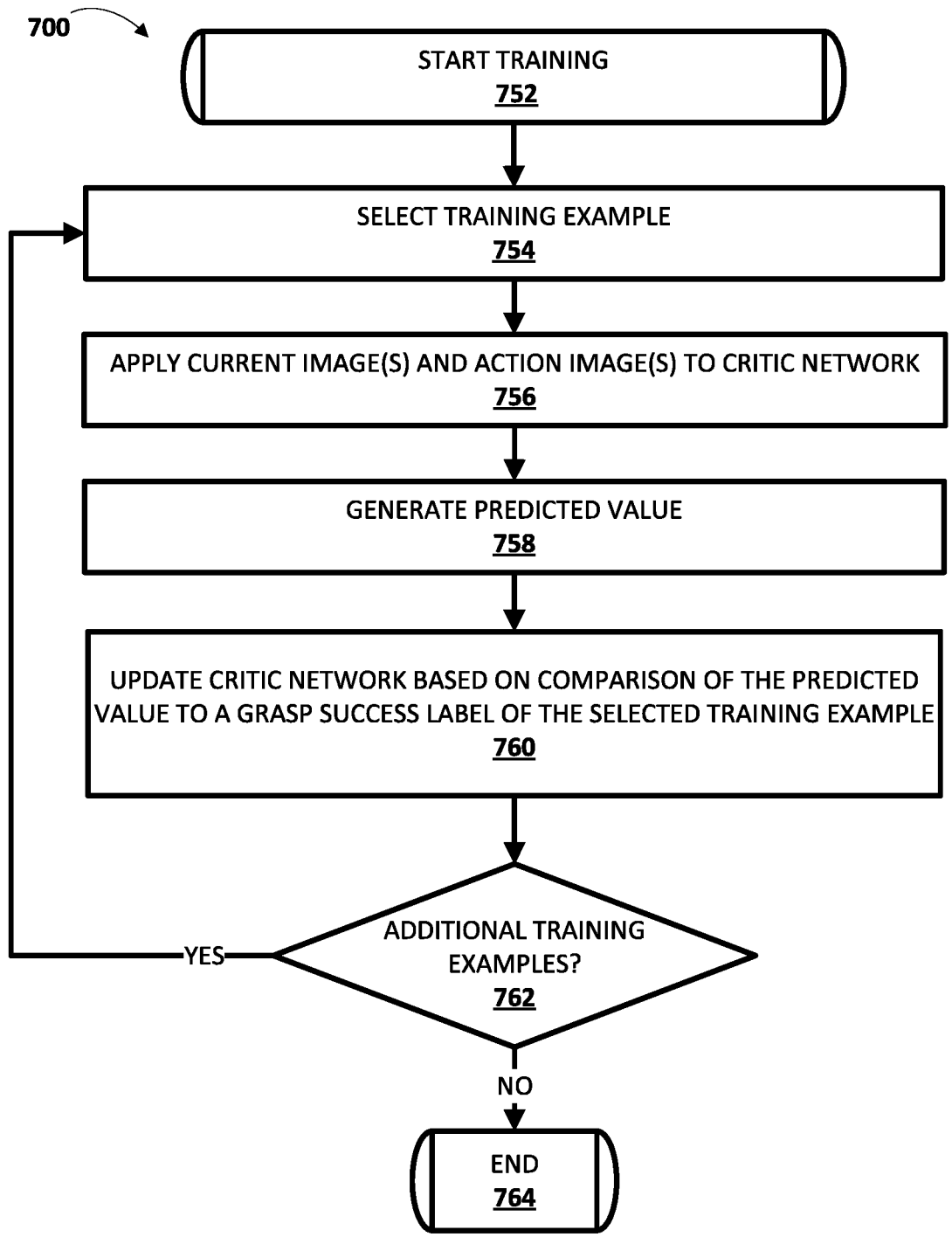
FIG. 7 is a flowchart illustrating an example method of training a critic network based on the training examples generated in the method of FIG. 6.

FIG. 7 is a flowchart illustrating an example method 700 of training a critic network based on the training examples generated in the method of FIG. 6. For convenience, the operations of the flowcharts are described with reference to a system that performs the operations. This system may include one or more components of computing device(s), such as a processor computing device 910 and/or other computing device(s). Moreover, while operations of method 700 are shown in a particular order, this is not meant to be limiting. One or more operations may be reordered, omitted or added.

At block 752, the system starts training.

At block 754, the system selects a training example generated, for example, according to method 600 of FIG. 6.

At block 756, the system applies one or more current images and one or more action images to a critic network.

At block 758, the system generates a predicted value.

At block 760, the system updates the critic network based on comparison of the predicted value generated at block 758 to a grasp success label of the selected training example. For example, the values can be compared to determine an error, a gradient can be determined based on the error (and optionally additional errors in batch techniques), and the gradient backpropagated to update the critic network. For example, the error can be based on the cross-entropy loss between the predicted value generated at block 758 and the grasp success label of the selected training example.

At block 762, the system determines whether additional training example(s) remain. If, at an iteration of block 762, the decision is yes, then the system returns to block 754 to select an additional training example. If, at an iteration of block 762, the decision is no, then the system proceeds to block 764 and the method 700 ends. In other implementations, the system can determine to end method 700 based on other considerations, such as occurrence of at least a threshold quantity or duration of training, evaluation of the trained critic network indicating satisfactory performance, and/or other consideration(s). Also, it is noted that, in some implementations, initially trained version(s) of the critic network can optionally be provided for use in performing iterations of method 500 (FIG. 5) in generating training data.

Figure 8:
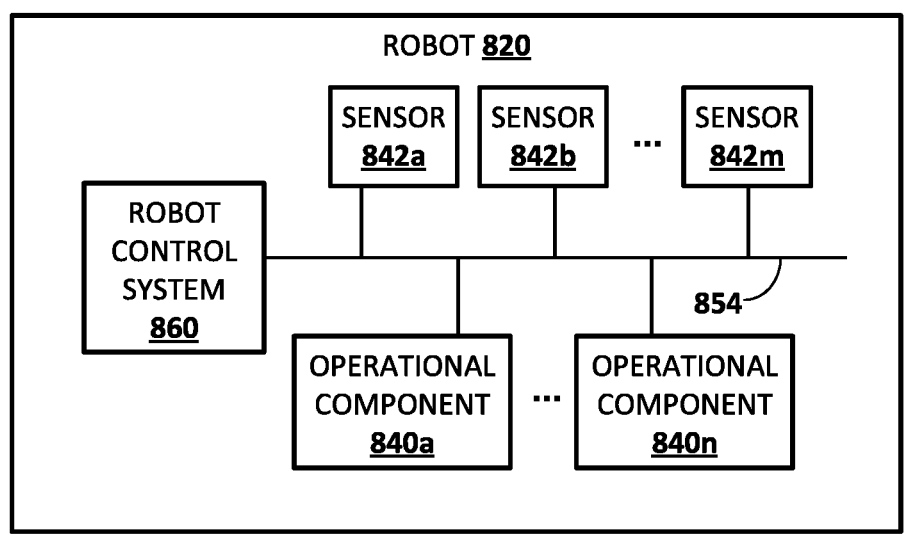
FIG. 8 schematically depicts an example architecture of a robot.

FIG. 8 schematically depicts an example architecture of a robot 820. The robot 820 includes a robot control system 860, one or more operational components 840a-840n, and one or more sensors 842a-842m. The sensors 842a-842m may include, for example, vision sensors, light sensors, pressure sensors, pressure wave sensors (e.g., microphones), proximity sensors, accelerometers, gyroscopes, thermometers, barometers, and so forth. While sensors 842a-m are depicted as being integral with robot 820, this is not meant to be limiting. In some implementations, sensors 842a-m may be located external to robot 820, e.g., as standalone units.

Operational components 840a-840n may include, for example, one or more end effectors and/or one or more servo motors or other actuators to effectuate movement of one or more components of the robot. For example, the robot 820 may have multiple degrees of freedom and each of the actuators may control actuation of the robot 820 within one or more of the degrees of freedom responsive to the control commands. As used herein, the term actuator encompasses a mechanical or electrical device that creates motion (e.g., a motor), in addition to any driver(s) that may be associated with the actuator and that translate received control commands into one or more signals for driving the actuator. Accordingly, providing a control command to an actuator may comprise providing the control command to a driver that translates the control command into appropriate signals for driving an electrical or mechanical device to create desired motion.

The robot control system 860 may be implemented in one or more processors, such as a CPU, GPU, and/or other controller(s) of the robot 820. In some implementations, the robot 820 may comprise a "brain box" that may include all or aspects of the control system 860. For example, the brain box may provide real time bursts of data to the operational components 840a-n, with each of the real time bursts comprising a set of one or more control commands that dictate, inter alia, the parameters of motion (if any) for each of one or more of the operational components 840a-n. In some implementations, the robot control system 860 may perform one or more aspects of method 200 described herein.

As described herein, in some implementations all or aspects of the control commands generated by control system 860 in traversing a robotic component to a particular pose can be based on determining that particular pose is likely to result in successful performance of a task, as determined according to implementations described herein. Although control system 860 is illustrated in FIG. 8 as an integral part of the robot 820, in some implementations, all or aspects of the control system 860 may be implemented in a component that is separate from, but in communication with, robot 820. For example, all or aspects of control system 860 may be implemented on one or more computing devices that are in wired and/or wireless communication with the robot 820, such as computing device 910.

Figure 9:
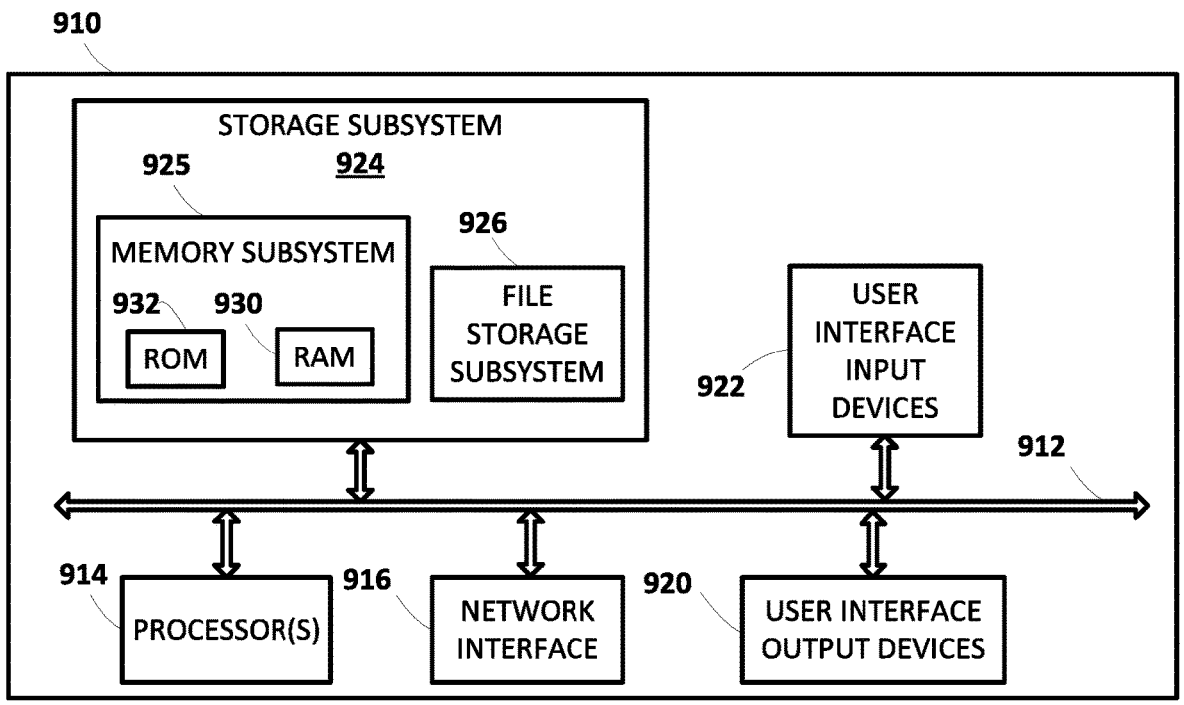
FIG. 9 schematically depicts an example architecture of a computer system.

FIG. 9 is a block diagram of an example computing device 910 that may optionally be utilized to perform one or more aspects of techniques described herein. Computing device 910 typically includes at least one processor 914 which communicates with a number of peripheral devices via bus subsystem 912. These peripheral devices may include a storage subsystem 924, including, for example, a memory subsystem 925 and a file storage subsystem 926, user interface output devices 920, user interface input devices 922, and a network interface subsystem 916. The input and output devices allow user interaction with computing device 910. Network interface subsystem 916 provides an interface to outside networks and is coupled to corresponding interface devices in other computing devices.

User interface input devices 922 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computing device 910 or onto a communication network.

User interface output devices 920 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computing device 910 to the user or to another machine or computing device.

Storage subsystem 924 stores programming and data constructs that provide the functionality of some or all of the modules described herein. For example, the storage subsystem 924 may include the logic to perform selected aspects of the method of FIGS. 2A, 2B, 5, 6, and/or 7.

These software modules are generally executed by processor 914 alone or in combination with other processors. Memory 925 used in the storage subsystem 924 can include a number of memories including a main random access memory (RAM) 930 for storage of instructions and data during program execution and a read only memory (ROM) 932 in which fixed instructions are stored. A file storage subsystem 926 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 926 in the storage subsystem 924, or in other machines accessible by the processor(s) 914.

Bus subsystem 912 provides a mechanism for letting the various components and subsystems of computing device 910 communicate with each other as intended. Although bus subsystem 912 is shown schematically as a single bus, alternative implementations of the bus subsystem may use multiple busses.

Computing device 910 can be of varying types including a workstation, server, computing cluster, blade server, server farm, or any other data processing system or computing device. Due to the ever-changing nature of computers and networks, the description of computing device 910 depicted in FIG. 9 is intended only as a specific example for purposes of illustrating some implementations. Many other configurations of computing device 910 are possible having more or fewer components than the computing device depicted in FIG. 9.

In some implementations, a method implemented by one or more processors of a robot in performing a robotic task is provided and includes identifying a current image that is based on at least part of a current instance of vision data captured by a vision component of the robot. The method further includes identifying a particular action image that includes projections, for N points of an end effector of the robot for a particular pose of the end effector, onto a vision frame of the vision component. N is an integer greater than one. The method further includes processing, utilizing a trained critic network that represents a learned value function, the current image and the particular action image. The method further includes generating, based on the processing, a value for the particular pose. The value for the particular pose indicates a probability of success of the robotic task if the end effector is traversed to the particular pose. The method further includes, in response to determining that the value satisfies one or more conditions: controlling the robot to cause the end effector to traverse to the particular pose in performing the robotic action.

These and other implementations of the technology disclosed herein can include one or more of the following features.

In some implementations, the action image has N channels, and each of the N channels includes a corresponding one-hot pixel that is a corresponding one of the projections for a corresponding one of the N points of the end effector. The "hot" value can be a "1", a "0", a "16", or other value that differs from the value of the "non-hot" pixels. In some versions of those implementations, the current instance of vision data is a red, green, blue (RGB) image, the current image is an RGB image, and each of the one-hot pixels of the action image is a fixed value. In some other version of those implementations, the current instance of vision data is a depth image, the current image is a depth image, and each of the one-hot pixels of the action image is a corresponding value indicative of a corresponding depth of a corresponding one of the projections for a corresponding one of the N points of the end effector. For example, the corresponding value can have a magnitude that is proportional to the corresponding depth (e.g., value of "1" having smallest depth, value of "256" having largest depth, value of "128" being between the smallest and largest depths, etc.). In some implementations, the corresponding value is a real number that indicates a depth of the end effector. In some other versions of those implementations, the current instance of vision data is a red, green, blue, depth (RGB-D) image, the current image is an RGB image, each of the one-hot pixels of the action image is a fixed value, and the method further includes: generating a depth current image based on the depth values of the RGB-D image; and identifying an additional particular action image that includes projections, for the N points of the end effector of the robot for the particular pose of the end effector, onto the vision frame of the vision component, wherein the additional particular action image includes additional one-hot pixels that includes a corresponding depth of a corresponding one of the projections for a corresponding one of the N points of the end effector. In such other versions, the processing further includes processing, utilizing the trained critic network, the depth current image and the additional particular action image, along with the current image and the particular action image.

In some implementations, the current image has a given width and a given height and the particular action image also has the given width and the given height. In some of those implementations, the method further includes: generating the particular action image based on cropping an initial action image with a frame that is centered, at a given pixel location, so as to encompass the projections for the N points of the end effector; and generating the current image based on cropping the current instance of vision data with the frame that is centered at the given pixel location.

In some implementations, the method further includes generating the particular action image. In some of those implementations, generating the particular action image includes: determining, for each of the N points, a corresponding three-dimensional location, for the particular pose, relative to a first frame; projecting the three-dimensional locations onto the vision frame using a kinematics based transformation that is from the first frame to the vision frame and that is dependent on a current vision component pose of the vision component; and assigning particular values to the pixels, of the action image, determined to correspond to the three-dimensional locations based on the projecting.

In some implementations, the one or more conditions include the value satisfying a fixed threshold. In some versions of those implementations, the method further includes: identifying a particular additional action image that includes additional projections, for the N points of the end effector of the robot for an additional particular pose of the end effector, onto the vision frame of the vision component; and processing, utilizing the trained critic network, an additional current image and the additional particular action image. The additional current image current is based on at least an additional part of the current instance of vision data, and is a crop, of the current instance of vision data, that is based on the additional action image. In those versions, the method further includes generating, based on the processing of the additional current image and the additional particular action image, an additional value for the additional particular pose. The additional value for the additional particular pose indicates an additional probability of success of the robotic task if the end effector is traversed to the additional particular pose. In those versions, the one or more conditions include the value being more indicative of success than the additional value. In some variants of those versions, the method further includes identifying the additional particular pose and the particular pose based on uniformly sampling of end effector poses that are within a workspace corresponding to the current instance of vision data. In some additional or alternative variants of those versions, the method further includes: detecting an object of interest based on the current instance of vision data; determining a portion of a workspace that corresponds to the object of interest; and identifying the additional particular pose and the particular pose based on sampling of end effector poses that are within the portion of the workspace. In some additional or alternative variants of those versions, the method further includes: identifying the additional particular pose and the particular pose based on sampling of end effector poses that are within a distribution of a prior particular pose selected based on a prior value generated for the prior particular pose. The prior value is generated based on processing, utilizing the critic network, a prior action image that corresponds to the prior particular pose and a prior current image generated based on the current instance of vision data.

In some implementations, the robotic task is a grasping task, and the method further includes, in response to determining that the end effector has reached the particular pose, controlling the end effector to cause one or more grasping members of the end effector to close in attempting the grasping task.

In some implementations, processing, utilizing the trained critic network, the current image and the particular action image includes: processing the current image using a first tower of the critic network to generate a current image embedding; processing the action image using a second tower of the critic network to generate an action image embedding; and processing a merged embedding using a post-merger tower of the critic network, the merged embedding including a concatenation of at least the current image embedding and the action image embedding.

In some implementations, a method implemented by one or more processors of a robot in performing a robotic task is provided and includes determining a plurality of candidate poses, for an end effector of the robot, based on sampling a pose space. The method further includes, for each of the candidate poses: generating a corresponding action image that projects, into a vision frame of a vision component of the robot, N points of the end effector for the candidate pose, where N is an integer greater than one; generating a corresponding cropped action image by cropping the action image, using a corresponding crop that encompasses the N points of the action image; and generating a corresponding cropped current image to pair with the corresponding cropped action image by cropping a current image, from the vision component, using the corresponding crop. The method further includes, for each of the cropped current image, cropped action image pairs: processing the cropped current image, cropped action image pair utilizing a trained critic network that represents a learned value function; generating, based on the processing, a corresponding value for the candidate pose that corresponds to cropped action image of the cropped current image, cropped action image pair; and determining whether any of the values satisfies a threshold. The method further includes, in response to determining that a given one of the values satisfies the threshold: controlling the robot to cause the end effector to traverse to the candidate pose, that corresponds to the given one of the values, in performing the robotic action.

What is claimed is:

1. A method implemented by one or more processors of a robot in performing a robotic task, the method comprising:
   identifying a current image that is based on at least part of a current instance of vision data captured by a vision component of the robot;
   identifying a particular action image that includes projections, for N points of an end effector of the robot for a particular pose of the end effector, onto a vision frame of the vision component, wherein N is an integer greater than one;
   processing, utilizing a trained critic network that represents a learned value function, the current image and the particular action image, wherein processing the current image utilizing the trained critic network comprises processing current image pixels, of the current image, utilizing the trained critic network;
   generating, based on the processing, a value for the particular pose,
      wherein the value for the particular pose indicates a probability of success of the robotic task if the end effector is traversed to the particular pose;
   in response to determining that the value satisfies one or more conditions:
      controlling the robot to cause the end effector to traverse to the particular pose in performing the robotic action.

2. The method of claim 1, wherein the action image has N channels, and wherein each of the N channels includes a corresponding one-hot pixel that is a corresponding one of the projections for a corresponding one of the N points of the end effector.

3. The method of claim 1, wherein the current image has a given width and a given height and the particular action image also has the given width and the given height.

4. The method of claim 3, further comprising:
   generating the particular action image based on cropping an initial action image with a frame that is centered, at a given pixel location, so as to encompass the projections for the N points of the end effector; and
   generating the current image based on cropping the current instance of vision data with the frame that is centered at the given pixel location.

5. The method of claim 1, further comprising:
   generating the particular action image, generating the particular action image comprising:
      determining, for each of the N points, a corresponding three-dimensional location, for the particular pose, relative to a first frame;
      projecting the three-dimensional locations onto the vision frame using a kinematics based transformation that is from the first frame to the vision frame and that is dependent on a current vision component pose of the vision component; and
      assigning particular values to the pixels, of the action image, determined to correspond to the three-dimensional locations based on the projecting.

6. The method of claim 1, wherein the one or more conditions comprise the value satisfying a fixed threshold.

7. The method of claim 6, further comprising:
   identifying a particular additional action image that includes additional projections, for the N points of the end effector of the robot for an additional particular pose of the end effector, onto the vision frame of the vision component;
   processing, utilizing the trained critic network, an additional current image and the additional particular action image,
      wherein the additional current image current is based on at least an additional part of the current instance of vision data, and is a crop, of the current instance of vision data, that is based on the additional action image;
   generating, based on the processing of the additional current image and the additional particular action image, an additional value for the additional particular pose,
      wherein the additional value for the additional particular pose indicates an additional probability of success of the robotic task if the end effector is traversed to the additional particular pose;
   wherein the one or more conditions comprise the value being more indicative of success than the additional value.

8. The method of claim 7, further comprising:
   identifying the additional particular pose and the particular pose based on uniform sampling of end effector poses that are within a workspace corresponding to the current instance of vision data.

9. The method of claim 7, further comprising:
   detecting an object of interest based on the current instance of vision data;
   determining a portion of a workspace that corresponds to the object of interest; and identifying the additional particular pose and the particular pose based on sampling of end effector poses that are within the portion of the workspace.

10. The method of claim 7, further comprising:
identifying the additional particular pose and the particular pose based on sampling of end effector poses that are within a distribution of a prior particular pose selected based on a prior value generated for the prior particular pose, the prior value being generated based on processing, utilizing the critic network, a prior action image that corresponds to the prior particular pose and a prior current image generated based on the current instance of vision data.

11. The method of claim 1, wherein the robotic task is a grasping task, and further comprising:
in response to determining that the end effector has reached the particular pose:
controlling the end effector to cause one or more grasping members of the end effector to close in attempting the grasping task.

12. The method of claim 2, wherein the current instance of vision data include a red, green, blue (RGB) image, the current image is an RGB image, and wherein each of the one-hot pixels of the action image is a fixed value.

13. The method of claim 2, wherein the current instance of vision data includes a depth image, the current image is a depth image, and wherein each of the one-hot pixels of the action image is a corresponding value indicative of a corresponding depth of a corresponding one of the projections for a corresponding one of the N points of the end effector.

14. The method of claim 2, wherein the current instance of vision data includes a red, green, blue, depth (RGB-D) image, the current image is an RGB image, and wherein each of the one-hot pixels of the action image is a fixed value, and further comprising:
generating a depth current image based on the depth values of the RGB-D image; and
identifying an additional particular action image that includes projections, for the N points of the end effector of the robot for the particular pose of the end effector, onto the vision frame of the vision component, wherein the additional particular action image includes additional one-hot pixels that includes a corresponding depth of a corresponding one of the projections for a corresponding one of the N points of the end effector;
wherein the processing further comprises processing, utilizing the trained critic network, the depth current image and the additional particular action image, along with the current image and the particular action image.

15. The method of claim 1, wherein processing, utilizing the trained critic network, the current image and the particular action image comprises:
processing the current image using a first tower of the critic network to generate a current image embedding;
processing the action image using a second tower of the critic network to generate an action image embedding;
processing a merged embedding using a post-merger tower of the critic network, the merged embedding including a concatenation of at least the current image embedding and the action image embedding.

16. The method of claim 2, wherein the corresponding one-hot pixels for each of the N channels have a first value, and all other pixels for the action image have a second value.

17. The method of claim 16, wherein the first value is "1", and second value is "0".

18. The method of claim 16, wherein the first value is "0", and second value is "1".

19. The method of claim 16, wherein the first value is not a "1" and is not a "0".

20. The method of claim 19, wherein the first value is a real number that indicates a depth of the end effector.

21. A method implemented by one or more processors of a robot in performing a robotic task, the method comprising:
determining a plurality of candidate poses, for an end effector of the robot, based on sampling a pose space;
for each of the candidate poses:
generating a corresponding action image that projects, into a vision frame of a vision component of the robot, N points of the end effector for the candidate pose, wherein N is an integer greater than one;
generating a corresponding cropped action image by cropping the action image, using a corresponding crop that encompasses the N points of the action image;
generating a corresponding cropped current image to pair with the corresponding cropped action image by cropping a current image, from the vision component, using the corresponding crop;
for each of the cropped current image, cropped action image pairs:
processing the cropped current image, cropped action image pair utilizing a trained critic network that represents a learned value function, wherein processing the cropped current image, cropped action image pair utilizing the trained critic network comprises processing, utilizing the trained critic network, current image pixels of the corresponding cropped current image of the cropped current image, cropped action image pair;
generating, based on the processing, a corresponding value for the candidate pose that corresponds to cropped action image of the cropped current image, cropped action image pair;
determining whether any of the values satisfies a threshold;
in response to determining that a given one of the values satisfies the threshold:
controlling the robot to cause the end effector to traverse to the candidate pose, that corresponds to the given one of the values, in performing the robotic action.

22. A robot, comprising:
an end effector;
a vision component viewing an environment;
a trained neural network model stored in one or more non-transitory computer readable media, the trained neural network model representing a learned value function;
at least one processor configured to:
identify a current image that is based on at least part of a current instance of vision data captured by the vision component;
identify a particular action image that includes projections, for N points of the end effector for a particular pose of the end effector, onto a vision frame of the vision component, wherein N is an integer greater than one;
process, utilizing a trained critic network that represents a learned value function, the current image and the particular action image, wherein in processing the current image utilizing the trained critic network the at least one processor is configured to process current image pixels, of the current image, utilizing the trained critic network;

generate, based on the processing, a value for the particular pose,
wherein the value for the particular pose indicates a probability of success of the robotic task if the end effector is traversed to the particular pose;
in response to determining that the value satisfies one or more conditions:
control the end effector to traverse the end effector to the particular pose in performing the robotic action.

* * * * *